United States Patent [19]

Loweg

[11] 4,091,616
[45] May 30, 1978

[54] CATALYTIC DEVICES FOR TREATING EXHAUST GASES OF INTERNAL COMBUSTION ENGINES

[75] Inventor: Heribert Loweg, Werne, Germany

[73] Assignee: Gewerkschaft Eisenhutte Westfalia, Germany

[21] Appl. No.: 661,631

[22] Filed: Feb. 26, 1976

[30] Foreign Application Priority Data

Mar. 4, 1975  Germany .................. 2509210

[51] Int. Cl.² ............................................. F01N 3/15
[52] U.S. Cl. .............................. 60/295; 23/288 FC; 60/298; 60/299; 60/302
[58] Field of Search .............. 60/298, 299, 302, 295, 60/321, 320; 23/288 FC

[56] References Cited

U.S. PATENT DOCUMENTS

| | | | |
|---|---|---|---|
| 3,441,381 | 4/1969 | Keith | 60/299 |
| 3,750,403 | 8/1973 | Deutschmann | 60/321 |
| 3,817,714 | 6/1974 | Wiley | 60/298 |
| 3,898,802 | 8/1975 | Tadokoro | 60/298 |
| 3,927,525 | 12/1975 | Jacobs | 60/302 |
| 3,935,705 | 2/1976 | Hergoualch | 60/302 |
| 3,957,446 | 3/1976 | Mayer | 60/302 |
| 4,015,429 | 5/1977 | Pichl | 60/298 |

FOREIGN PATENT DOCUMENTS 1,241,205  8/1971  United Kingdom .................. 60/321

*Primary Examiner*—Douglas Hart
*Attorney, Agent, or Firm*—Charles E. Pfund

[57] ABSTRACT

A catalytic device takes the form of a manifold connectible to the engine block of an internal combustion engine to receive the exhaust gases. The manifold has an outer jacket for receiving coolant, e.g., water, and within this jacket is provided a chamber containing a catalyst cartridge serving to treat the exhaust gases to remove carbon monoxide therefrom. The cartridge is replaceable and has a pipe at one end which forms an exhaust pipe and a tubular projection into which the gases are passed. The cartridge is spaced from the inner surface of the chamber wall and is thermally insulated therefrom.

4 Claims, 2 Drawing Figures

CATALYTIC DEVICES FOR TREATING EXHAUST GASES OF INTERNAL COMBUSTION ENGINES

BACKGROUND OF THE INVENTION

The present invention relates to a catalytic device for treating exhaust gases of internal combustion engines.

Diesel engines are sometimes employed in an underground mine working such as for driving locomotives. It is necessary to ensure that the exhaust gases from these engines are treated to remove harmful gases particularly carbon monoxide before being discharged into the ambient mine atmosphere. It is well known to use a suitable catalyst which when contacted by the hot exhaust gases will convert the carbon monoxide into carbon dioxide. Such a catalyst is arranged in a chamber through which exhaust gases are passed and in a known device the gases are first passed through a water-cooled manifold before entering the catalyst chamber. This produces a long bulky construction and moreover since the exhaust gases are cooled prior to entering the catalyst chamber the conversion is inefficient. Generally the known catalysts require working temperatures in excess of about 200° C and are more effective the higher the temperature of the gases in contact therewith.

A general object of the invention is to provide an improved form of catalytic device.

SUMMARY OF THE INVENTION

According to the invention there is provided a catalytic device for treating exhaust gases of internal combustion engines: said device having means for defining a chamber in which a catalytic cartridge is disposed defining a chamber in which a catalyst is arranged, means for defining a path for the exhaust gases to pass through the catalyst chamber for subsequent discharge means for locating the cartridge in the chamber to provide thermal insulation between the cartridge and at least part of the interior of the chamber defining means, a detachable closure for permitting easy access to the cartridge for replacement purposes and a jacket for receiving coolant which surrounds both the catalyst chamber and the path-defining means.

By arranging the catalyst inside a cooling jacket an an air gap forming the thermal insulation, a simple compact construction can result. Moreover, the catalytic conversion can take place at optimum efficiency since the flow path of the exhaust gases can be relatively short and the gases can enter the catalyst at a relatively high temperature. The manifold may contain a longitudinal passage for receiving the gases from the engine and communicating with the catalyst chamber.

It is desirable to provide thermo-insulation between the catalyst and at least part of the internal surface of the catalyst chamber.

The chamber defining means may also define an antechamber disposed within the cooling jacket and supported from the catalyst chamber by a partition having an opening permitting the exhaust gases to pass from the antechamber into the catalyst chamber. This antechamber can then communicate with the aforesaid longitudinal passage. In order to permit easy removal and replacement of the catalyst cartridge a detachable end plate constituting said closure may be located opposite the partition. The cartridge preferably has a tubular projection at one end which fits onto a flange surrounding the opening in the partition and a further tubular projection at the other end which extends through the end plate and serves to discharge the treated exhaust gases in the manner of an exhaust pipe.

The invention may be understood more readily and various other features of the invention may become apparent from consideration of the following description.

BRIEF DESCRIPTION OF DRAWING

An embodiment of the invention will now be described, by way of example only, with reference to the accompanying drawings, wherein.

DESCRIPTION OF PREFERRED EMBODIMENT

Figure 1:
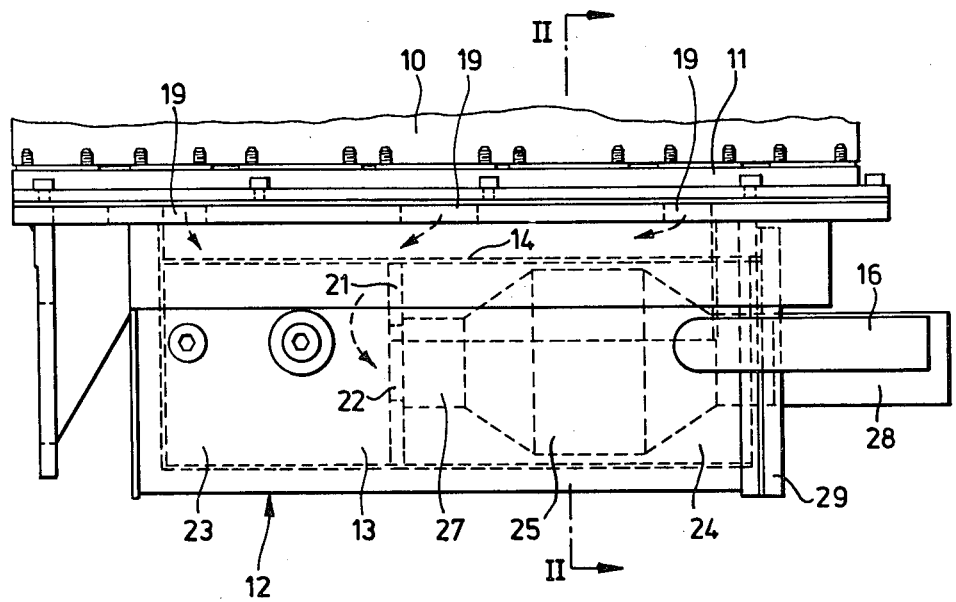
FIG. 1 is a schematic plan view of a device made in accordance with the invention.

In the drawing the reference numeral 10 generally designates a part of the engine block of a combustion engine and more usually a diesel-engine. To this part 10 is attached an exhaust manifold 12 embodying the present invention. The manifold 12 is secured by bolts or screws and an intermediate plate 11 is mounted on the block part 10 to receive the manifold 12. The manifold 12 has a curvilinear outer wall 13 and a concentric curvilinear inner wall 14 so that a cooling jacket 15 of generally annular shape is defined between these walls 13, 14. Cooling fluid, more usually water, is circulated through the jacket 15 to cool the structure and the cooling can be such as to maintain the outer wall 13 at a temperature of about 120° C during operation as is generally desirable when the engine is installed in an underground mine working. The coolant is introduced to the jacket 15 via an inlet 16 at one end of the manifold 12 and is withdrawn from a similar outlet (not shown) arranged at the opposite end of the manifold 12. The inlet 16 is mounted near an end wall 29 which is detachably secured as by screws.

Figure 2:
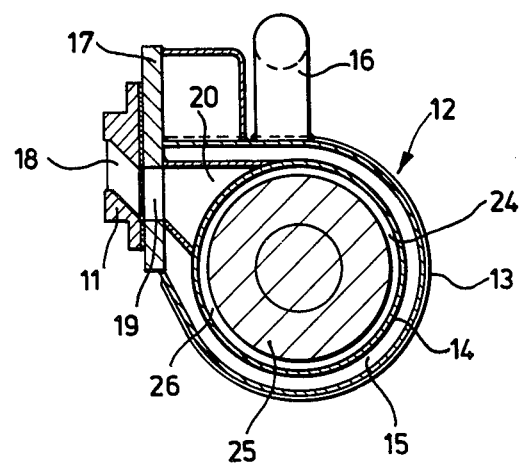
FIG. 2 is a cross-sectional view of the device taken along the line II—II of FIG. 1.

The wall 14 is circular and the wall 13 has tangential continuities which are joined at their terminal ends, as by welding, to a stout connection plate 17 which is attached to the plate 11 by means of screws or bolts. The outer periphery of the inner wall 14 is joined via additional walls to the plate 17 as by welding as shown in FIG. 2.

The plates 11, 17 have communicating passages 18, 19 therein which serve as an outlet for the hot exhaust gases from the engine. These passages 18, 19 adjoin a longitudinal passage or chamber 20 in the manifold 12 which is defined by the additional walls and a portion of the wall 14. The interior space defined within the wall 14 is divided at around its longitudinal central zone by a partition 21 having a central opening 22. This partition 21 thus divides the interior space into an antechamber 23, and a catalytic chamber 24. This latter chamber 24 receives a catalyst preferably in the form of a replaceable cartridge 25 having a diameter somewhat smaller than the interior space. In this way an annular gap 26 is formed between the outside of the cartridge 25 and the inner surface of the part of the wall 14 defining the chamber 24. This gap 26 can provide a thermally insulating layer of air although an insulating material can be introduced into the gap 26. At its inner end the cartridge 25 has a tubular projection 27 which is pushed onto a tubular flange of the partition 21 surrounding the opening 22. At its opposite end the cartridge 25 has a somewhat longer tubular projection or pipe 28 which extends through a central opening of the end wall 29.

As mentioned this wall 29 is detachable and permits the installation of the cartridge 25 into the chamber 24 and the push-fit connection between the projection 27 and its corresponding flange. Openings, not shown, interconnect the passage 20 with the antechamber 23 so that when the engine is operated the exhaust gases flow through the passages 18, 19, 20 into the chamber 23. From there the gases flow through the opening 22 and the interior of the projection 27 into the cartridge 25. The carbon monoxide gas component is then converted into carbon dioxide by the action of the catalyst and the now-treated exhaust gases discharge from the outlet exhaust pipe 28.

The complete device is quite simple and efficiently utilizes all the available space. The exhaust gases are passed to the catalyst along a relatively short path which provides for efficient conversion because the temperature of the gases can be relatively high. The coolant however ensures that the external temperature of the device is maintained below a maximum permissible value.

I claim:

1. A catalytic device for treating exhaust gases; said device comprising a chamber through which the exhaust gases are passed; a replaceable cartridge having projections at both ends constituting a catalyst and arranged in said chamber; means locating said cartridge in the chamber for detachment and to create an annular air gap surrounding the cartridge and forming thermal insulation in respect of the interior of the chamber; a liquid cooling jacket surrounding said chamber; an antechamber separated from the catalytic chamber by a partition having an opening permitting the exhaust gases to pass from the antechamber into a catalytic chamber and a detachable end plate closure at one end of the device remote from the partition which can be detached to allow the introduction or removal of said cartridge, wherein the cartridge projection at one end engages with the opening in the partition and the cartridge projection at the other end extends through the end plate closure and serves to discharge the treated exhaust gases.

2. A device according to claim 1 in the form of an exhaust manifold securable to an engine block of an internal combustion engine.

3. A catalytic device for treating exhaust gases of internal combustion engines in underground mine workings; said device comprising means for defining a chamber in which a catalytic cartridge is arranged, the catalytic cartridge having projections at both ends, means for defining a path for the exhaust gases to pass through the catalytic chamber for subsequent discharge, a detachable cover for permitting easy access to said cartridge for replacement purposes, a jacket for receiving water which surrounds both said chamber and the path-defining means; and an antechamber separated from the catalytic chamber by a partition of said antechamber having a flanged opening permitting the exhaust gases to pass from the antechamber into the catalytic chamber, the cartridge projection at one end locating with the flange of the opening in the partition and the cartridge projection at the other end extending through the cover to allow discharge of the treated exhaust gases, the cartridge being located in said chamber to provide thermal insulation between said cartridge and at least part of the chamber defining means.

4. A device according to claim 3 in the form of an exhaust manifold securable to an engine block of an internal combustion engine.

* * * * *